(12) United States Patent
Hongpeng et al.

(10) Patent No.: US 9,879,765 B2
(45) Date of Patent: Jan. 30, 2018

(54) VEHICLE DRIVE SYSTEM

(71) Applicant: Big Lift, LLC, Lombard, IL (US)

(72) Inventors: Xu Hongpeng, Hangzhou (CN); Jin Miaofeng, Hangzhou (CN); Xu Linjie, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days.

(21) Appl. No.: 15/163,304

(22) Filed: May 24, 2016

(65) Prior Publication Data
US 2017/0299023 A1    Oct. 19, 2017

(30) Foreign Application Priority Data

Apr. 15, 2016   (CN) .......................... 2016 1 0235897

(51) Int. Cl.
| | |
|---|---|
| *B60K 1/00* | (2006.01) |
| *F16H 7/14* | (2006.01) |
| *F16H 7/06* | (2006.01) |

(52) U.S. Cl.
CPC ............... *F16H 7/14* (2013.01); *B60K 1/00* (2013.01); *F16H 7/06* (2013.01)

(58) Field of Classification Search
CPC ............. B60K 1/00; B60K 2007/0061; B60K 2007/0038; B60K 17/145; B60L 2200/44; F16H 7/14; F16H 7/06
See application file for complete search history.

(56) References Cited

U.S. PATENT DOCUMENTS

| | | | | |
|---|---|---|---|---|
| 1,171,992 | A * | 2/1916 | Walser | B60K 1/00 180/214 |
| 1,346,915 | A * | 7/1920 | Sauvage | B60K 1/00 180/214 |
| 2,209,356 | A | 7/1940 | Schreck | |
| 2,359,493 | A | 10/1944 | Schreck | |
| 2,395,323 | A * | 2/1946 | Framhein | B60K 1/00 180/65.6 |
| 3,330,371 | A * | 7/1967 | Seaman | B60K 1/00 180/11 |
| 3,760,770 | A * | 9/1973 | Weaver | A01D 90/10 119/57.6 |
| 4,287,959 | A | 9/1981 | Inman | |
| 4,631,044 | A * | 12/1986 | Redmon | F16H 7/02 248/656 |
| 5,699,869 | A * | 12/1997 | Fritzinger | A63H 31/00 180/65.51 |
| 2006/0025268 | A1* | 2/2006 | Chang | B60K 7/0015 475/83 |
| 2010/0117327 | A1* | 5/2010 | Hadley | B62M 6/90 280/214 |

\* cited by examiner

*Primary Examiner* — Frank B Vanaman
(74) *Attorney, Agent, or Firm* — Cook Alex LTD.

(57) ABSTRACT

The disclosure provides a vehicle drive system that includes a drive pedestal, a drive motor mounting plate connected to the drive pedestal, an electric drive motor assembly having an output shaft and being connected to the drive motor mounting plate, at least two bearings connected to the drive pedestal, an axle shaft rotatably connected to the at least two bearings, a drive wheel connected to the axle shaft, a chain drive assembly, and a controller that provides control signals to the electric drive motor assembly and is connected to the drive pedestal. The electric drive motor assembly also includes a first gear speed reduction, while the chain drive assembly includes a second gear speed reduction.

16 Claims, 11 Drawing Sheets

VEHICLE DRIVE SYSTEM

CROSS-REFERENCE TO RELATED APPLICATION

This application claims priority to Chinese Patent Application No. 201610235897.5, filed Apr. 18, 2016, which is hereby incorporated by reference in its entirety.

TECHNICAL FIELD

The invention relates to drive systems for use in material handling vehicles, such as pallet trucks, and in particular to a new vehicle drive system that includes in one integrated assembly a drive pedestal, a drive motor mounting plate, an electric drive motor assembly, a drive wheel, a chain drive assembly, and a controller.

BACKGROUND

Material handling equipment is widely used in warehouses, and electric powered vehicles are continuing to become more popular for at least environmental and noise related advantages over gas powered vehicles. Electric powered vehicles also have advantages over manual powered vehicles relating to at least capacity, operator safety and efficiency. However, due to the high rotational speed of common electric drive motors, it has not been possible to use an electric drive motor to directly drive a drive wheel of a vehicle, such as a pallet truck. Typically, a transmission having a gear box containing multiple gears and lubricant is required in a drive system to reduce the input speed that will be used to rotate the drive wheel. The multiple gears and lubricant result in undesirable complexity, and cause the structure of the transmission to occupy a large space or volume, while making the sealing of the transmission difficult and susceptible to leakage. In turn, this leads to higher costs and greater difficulty in servicing the drive system of such equipment. In addition, to save space or disperse the volume required for componentry, it is common for a controller to be separately mounted to the vehicle in a location spaced from the drive motor and transmission. The separate mounting requires that the connection between the components be made via cables and harnesses. During use of such vehicles, the drive system often includes movement, such as when the drive wheel is used to steer the vehicle. This movement tends to cause the cables or harnesses extending between a separately mounted controller and the electric drive motor to wear and possibly become loosened.

SUMMARY

The subject matter of this disclosure provides advantages over the structures of typical prior art drive systems for material handling equipment, such as pallet trucks. In contrast to prior art electric vehicle drive systems, the present disclosure provides an example drive system that includes in one integrated assembly a drive pedestal, a drive motor mounting plate, an electric drive motor assembly, a drive wheel, a chain drive assembly, and a controller. The electric drive motor assembly also includes a first gear speed reduction, while the chain drive assembly includes a second gear speed reduction. This new drive system advantageously provides a highly compact, cost effective and reliable drive system for material handling vehicles. This improved configuration permits a reduction in cost, complexity, volume, and potential fluid leakage, while providing for more convenient service for vehicle drive systems, such as for use in pallet trucks. Indeed, the example configuration described herein is able to provide a pallet truck having a compact drive system that helps provide improved reliability and operator efficiency.

In a first aspect, the disclosure provides a vehicle drive system that includes a drive pedestal, a drive motor mounting plate having an adjustable connection to the drive pedestal, an electric drive motor assembly having an output shaft and being connected to the drive motor mounting plate, at least two bearings connected to the drive pedestal, an axle shaft rotatably connected to the at least two bearings, a drive wheel connected to the axle shaft, a chain drive assembly and a controller that provides control signals to the electric drive motor assembly and is connected to the drive pedestal. The chain drive assembly further includes a first gear chain wheel connected to the output shaft of the electric drive motor assembly and having a first diameter, a second gear chain wheel connected to the drive wheel and having a second diameter that is larger than the first diameter of the first gear chain wheel, and a chain extending between and engaging the first and second gear chain wheels.

In another aspect, the disclosure provides a vehicle drive system wherein the electric drive motor assembly includes a first gear speed reduction and the chain drive assembly includes a second gear speed reduction.

In a further aspect, the disclosure provides a vehicle drive system that may include a controller cover and a chain drive assembly cover, both of which protect components from dust, dirt, debris and contact with foreign objects.

In still a further aspect, the disclosure provides a vehicle drive system wherein the adjustable connection of the drive motor mounting plate to the drive pedestal may include adjustment screws that engage the drive pedestal and the drive motor mounting plate, and movement of the drive motor mounting plate away from the axle shaft reduces slack in the chain.

In yet another aspect, the disclosure provides a vehicle drive system that may provide a first gear chain wheel having two parallel sets of teeth, a second gear chain wheel having two parallel sets of teeth, and a chain having links that engage the two parallel sets of teeth on the first and second gear chain wheels, all of which help to handle the torque requirements and provide improved reliability of the vehicle drive system.

Thus, the present disclosure presents alternatives to prior art vehicle drive systems for material handling equipment, such as pallet trucks. The new vehicle drive systems provide advantageous features by bringing together previously separated components to improve the compactness, utility and efficiency in operating such equipment. The example vehicle drive system may achieve lower output loss and accurate speed reduction, while improving the ease of servicing the equipment. Also, the controller on the drive pedestal rotates with the drive system during steering, which helps to minimize cable or harness lengths and to protect such components from damage, while reducing the possibility of loosening electrical connections.

It is to be understood that both the foregoing general description and the following detailed description are exemplary and provided for purposes of explanation only, and are not restrictive with respect to the claimed subject matter. Further features and advantages will become more fully apparent in the following description of the example preferred embodiment and from the appended claims.

BRIEF DESCRIPTION OF THE DRAWINGS

In describing the preferred examples, references are made to the accompanying drawing figures wherein like parts have like reference numerals. For ease of viewing and comprehension, several of the figures show less than an entire vehicle drive system or show only particular components of the system.

It should be understood that the drawings are not necessarily to scale. While some mechanical details of vehicle drive systems for material handling equipment have been omitted, including some details of fastening or connecting means and other plan and section views of the particular components, such details are considered to be within the comprehension of those skilled in the art in light of the present disclosure. It also should be understood that the present disclosure is not limited to the examples illustrated and described.

DETAILED DESCRIPTION OF THE PREFERRED EMBODIMENT

This disclosure provides solutions to the technical problems presented by existing vehicle drive systems for material handling equipment, such as are used in pallet trucks. An example of a new vehicle drive system is described further herein in reference to a preferred embodiment shown in the accompanying drawing FIGS. 1-13. It will be appreciated, however, that the invention may be constructed and configured in various ways and is not limited to the specific example shown and described herein.

Figure 1:
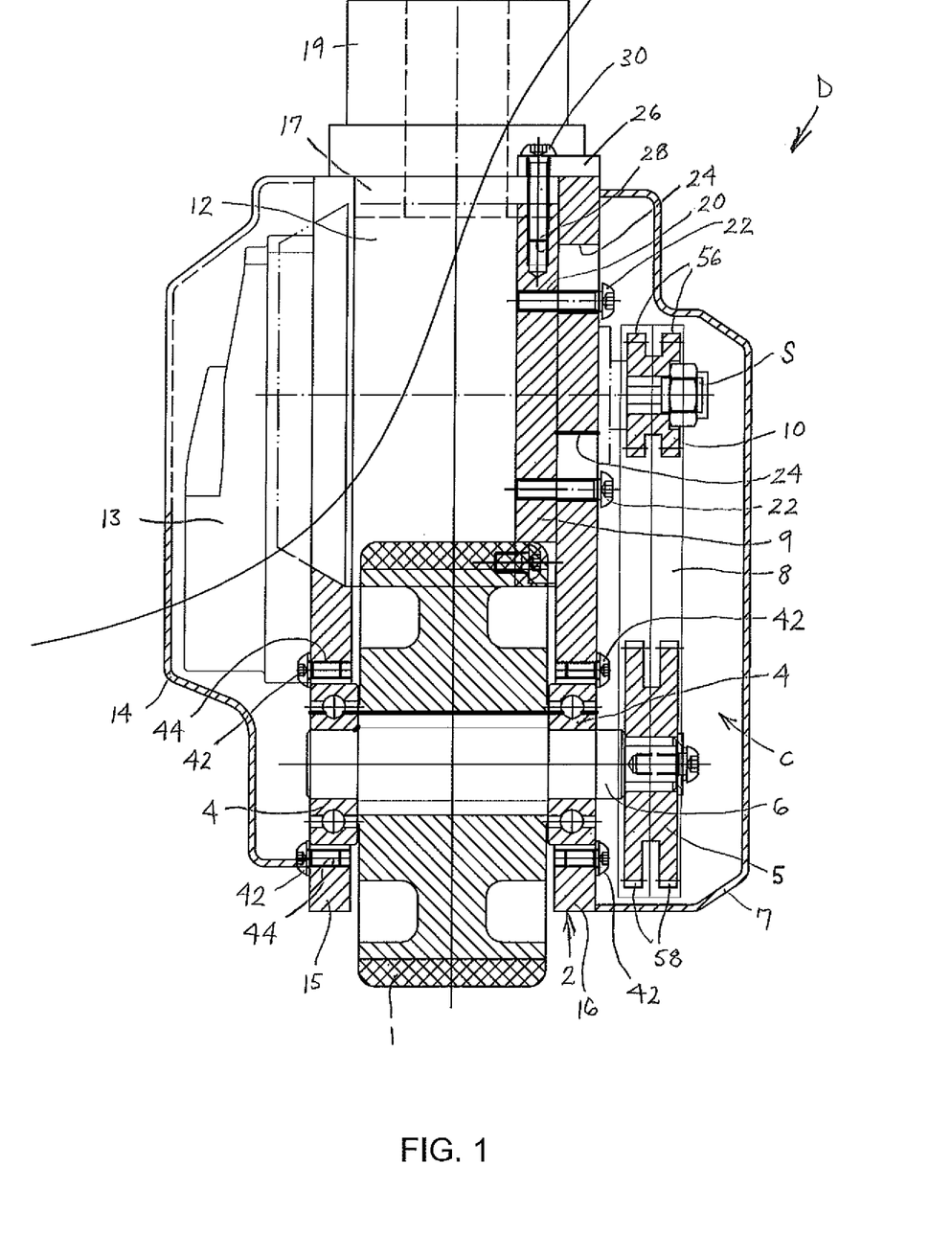
FIG. 1 is a rear partial cross section plan view of a vehicle drive system.
Figure 2:
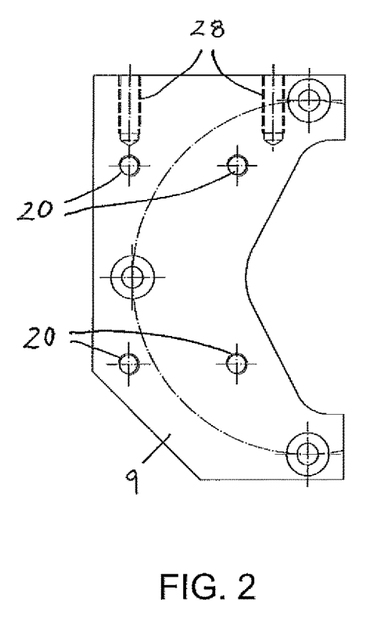
FIG. 2 is a right side plan view of a drive motor mounting plate from the vehicle drive system shown in FIG. 1.
Figure 11:
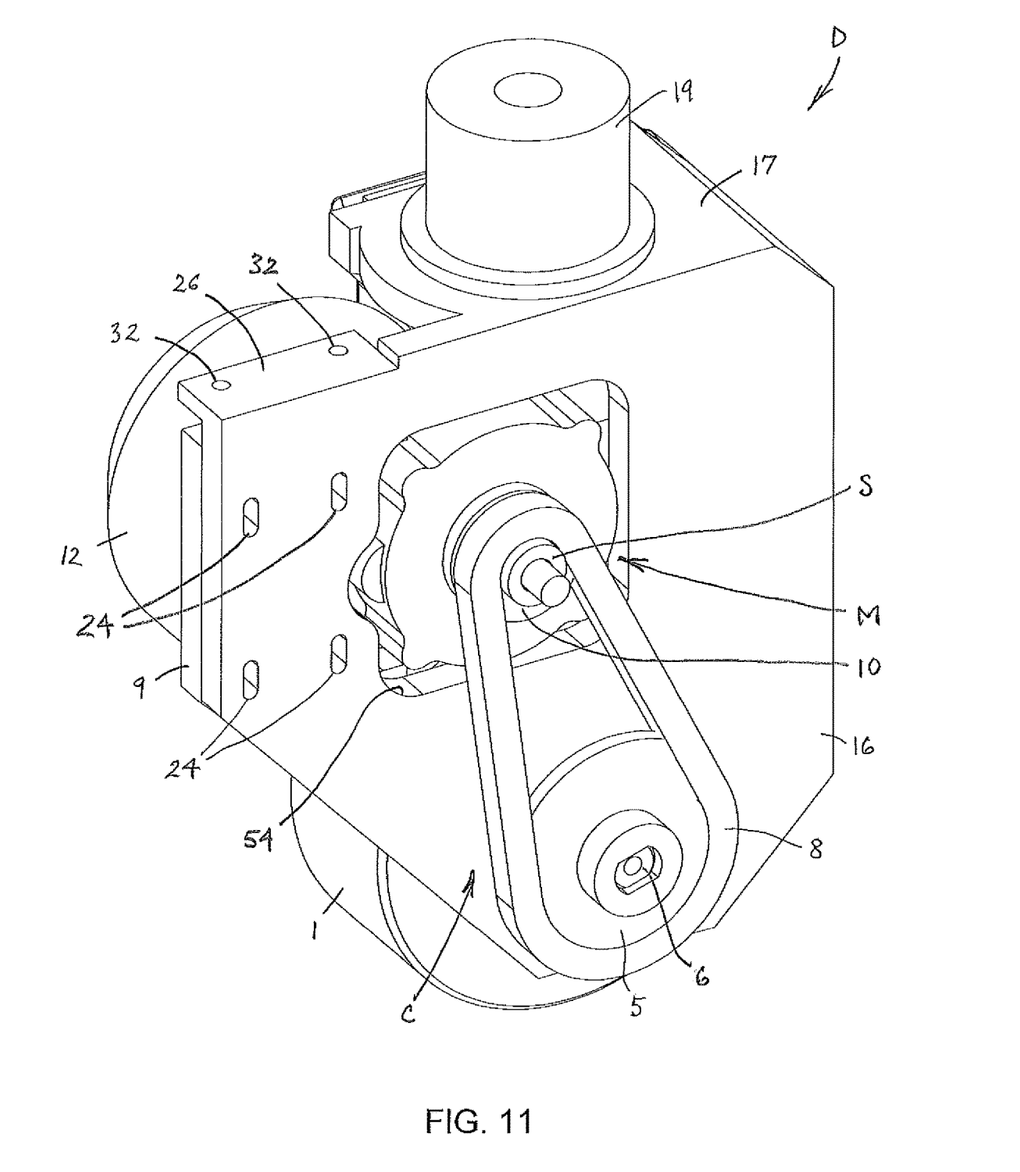
FIG. 11 is a right rear perspective view of the vehicle drive system shown in FIG. 1, with the chain drive assembly cover removed.
Figure 12:
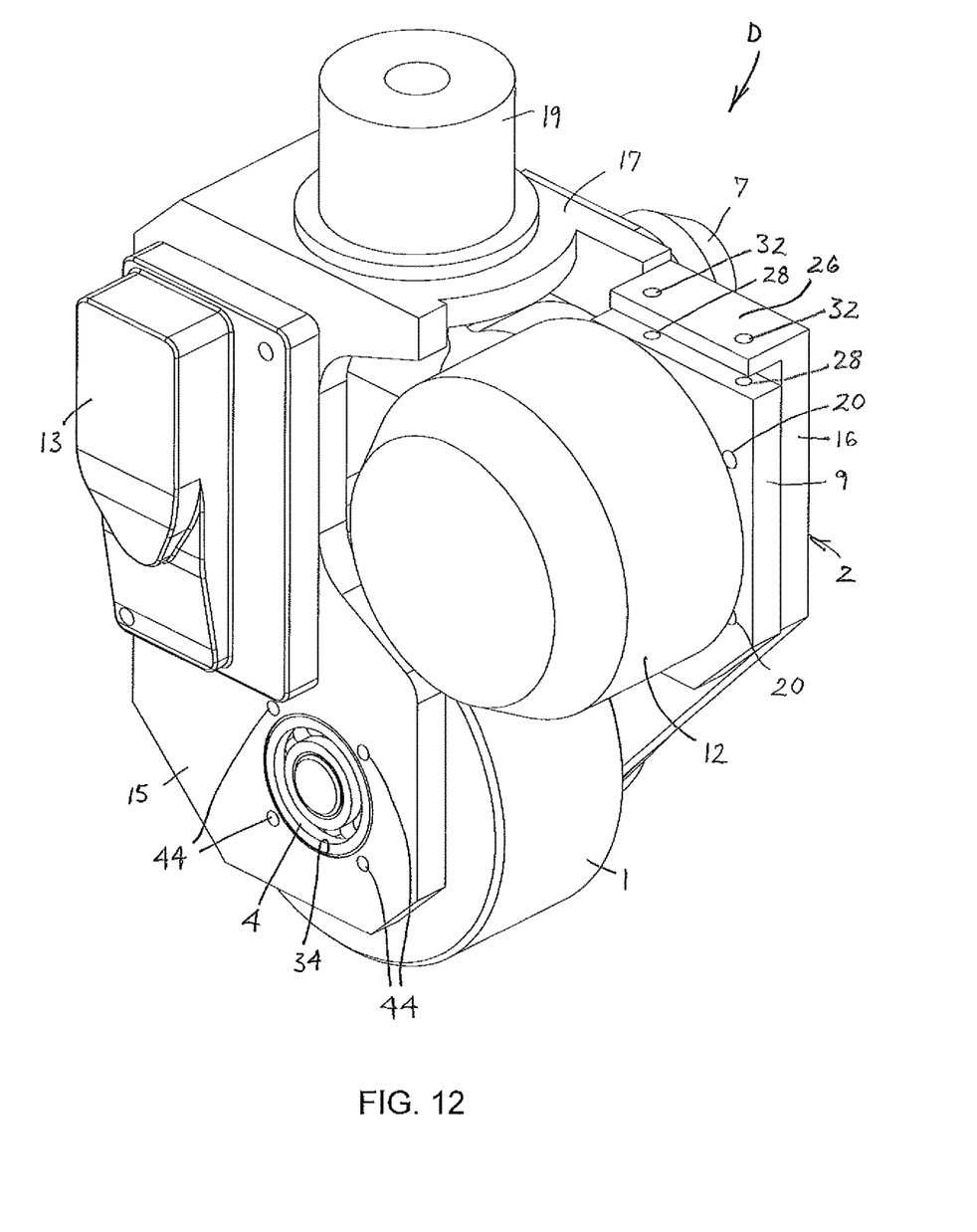
FIG. 12 is a left rear perspective view of the vehicle drive system shown in FIG. 1, with the controller cover removed.
Figure 13:
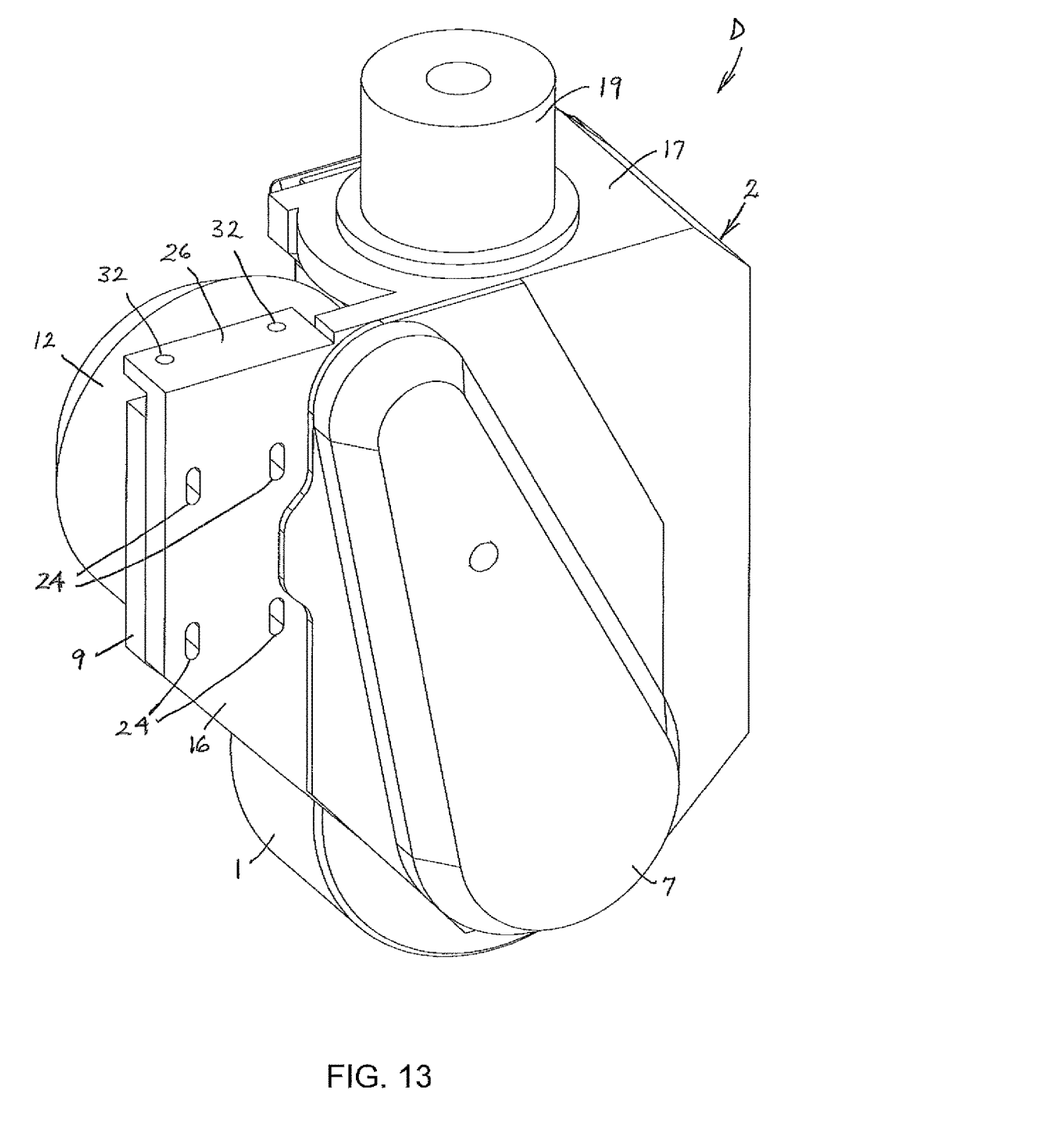
FIG. 13 is a right rear perspective view of the vehicle drive system shown in FIG. 1.

The disclosure teaches a vehicle drive system D having in one integrated assembly a drive pedestal 2, a drive motor mounting plate 9, an electric drive motor assembly M, a drive wheel 1, a chain drive assembly C, and a controller 13, as best seen in FIGS. 1, 11 and 13. The electric drive motor assembly M is connected to the drive motor mounting plate 9, which in turn is adjustably connected to the drive pedestal 2, as further seen in FIGS. 1 and 6-8.

Figure 3:
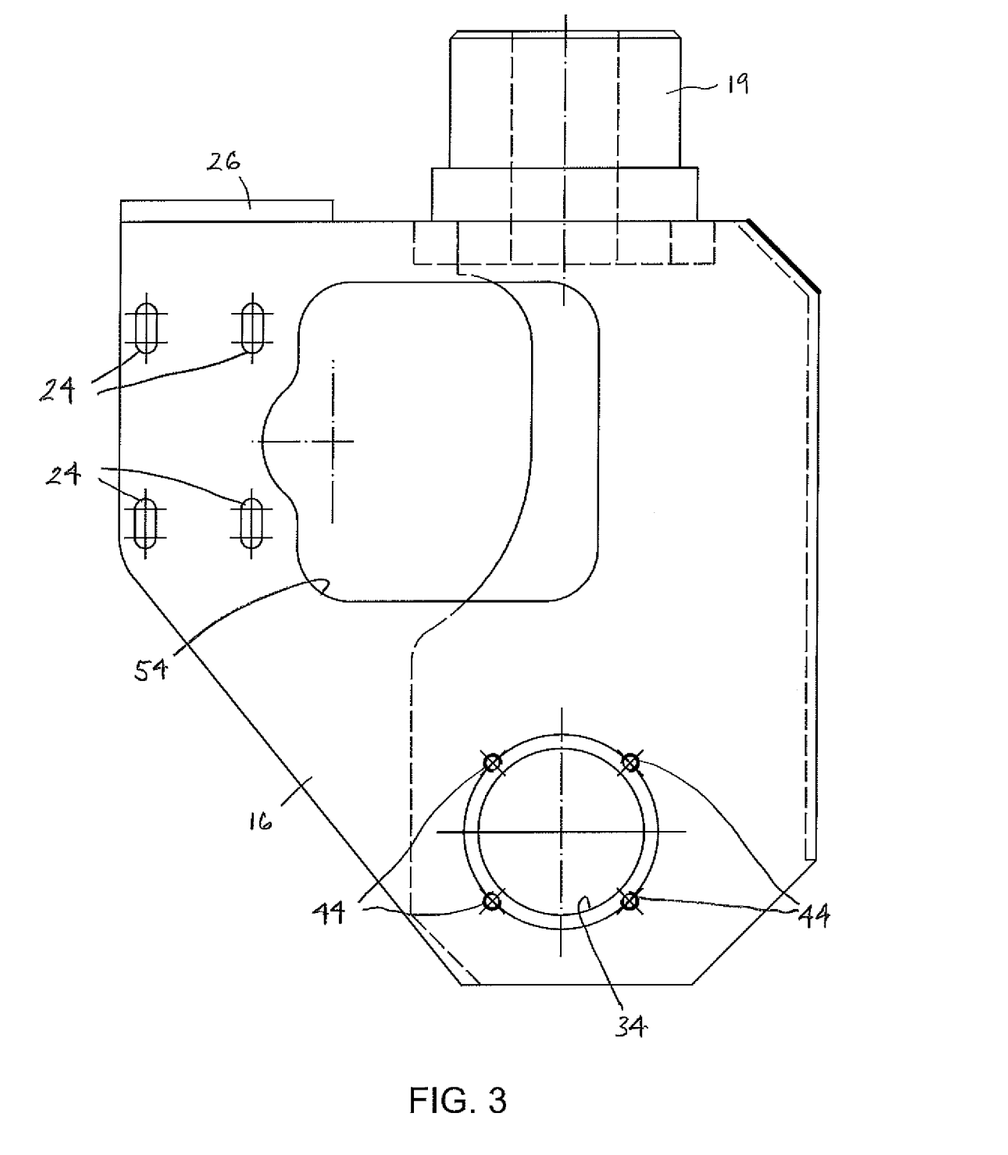
FIG. 3 is a right side plan view of a drive pedestal from the vehicle drive system shown in FIG. 1.
Figure 4:
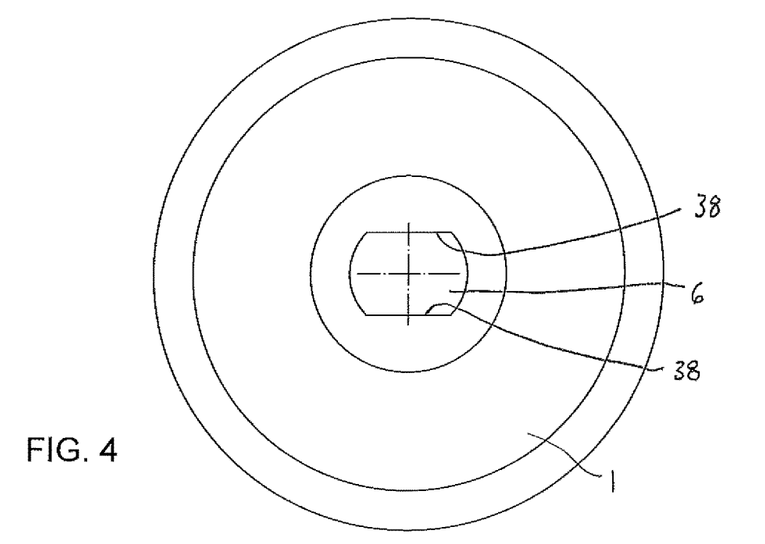
FIG. 4 is a right side plan view of a drive wheel from the vehicle drive system shown in FIG. 1.
Figure 5:
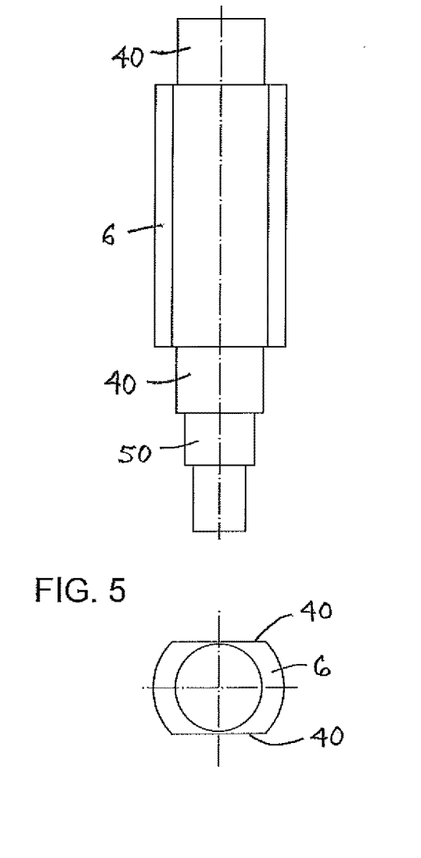
FIG. 5 includes a top plan view and a left end plan view of an axle shaft of the vehicle drive system shown in FIG. 1.
Figure 6:
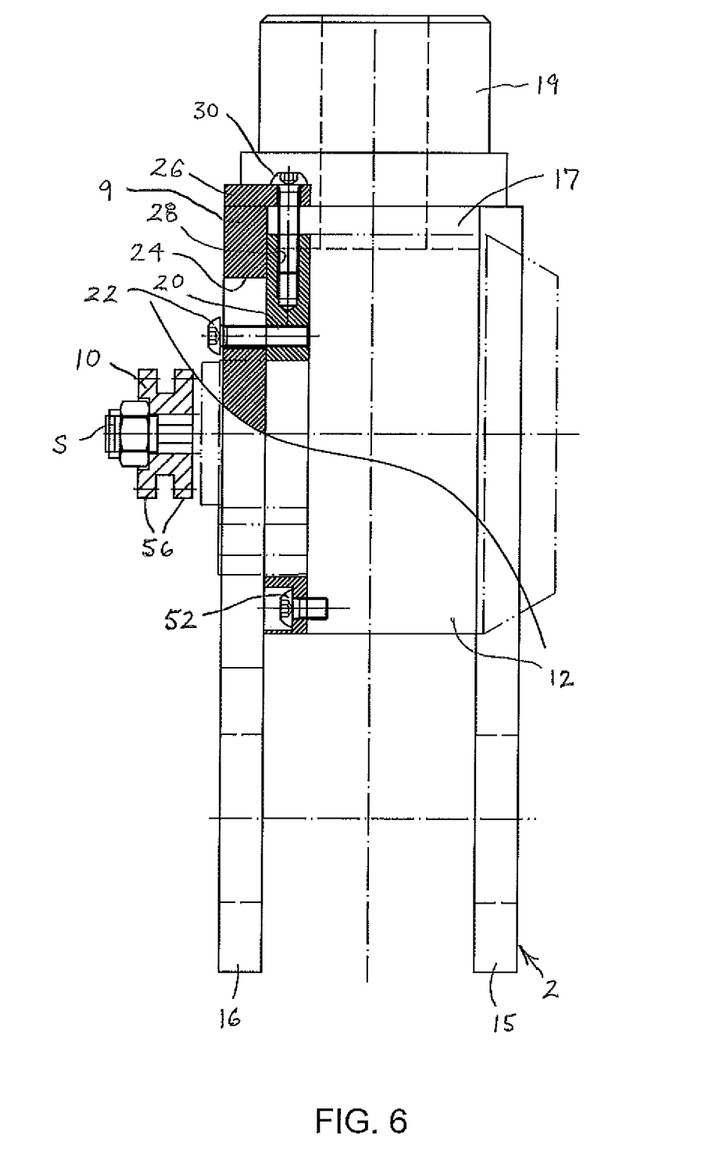
FIG. 6 is a front partial cross section plan view of a portion of the assembly of the vehicle drive system shown in FIG. 1.
Figure 7:
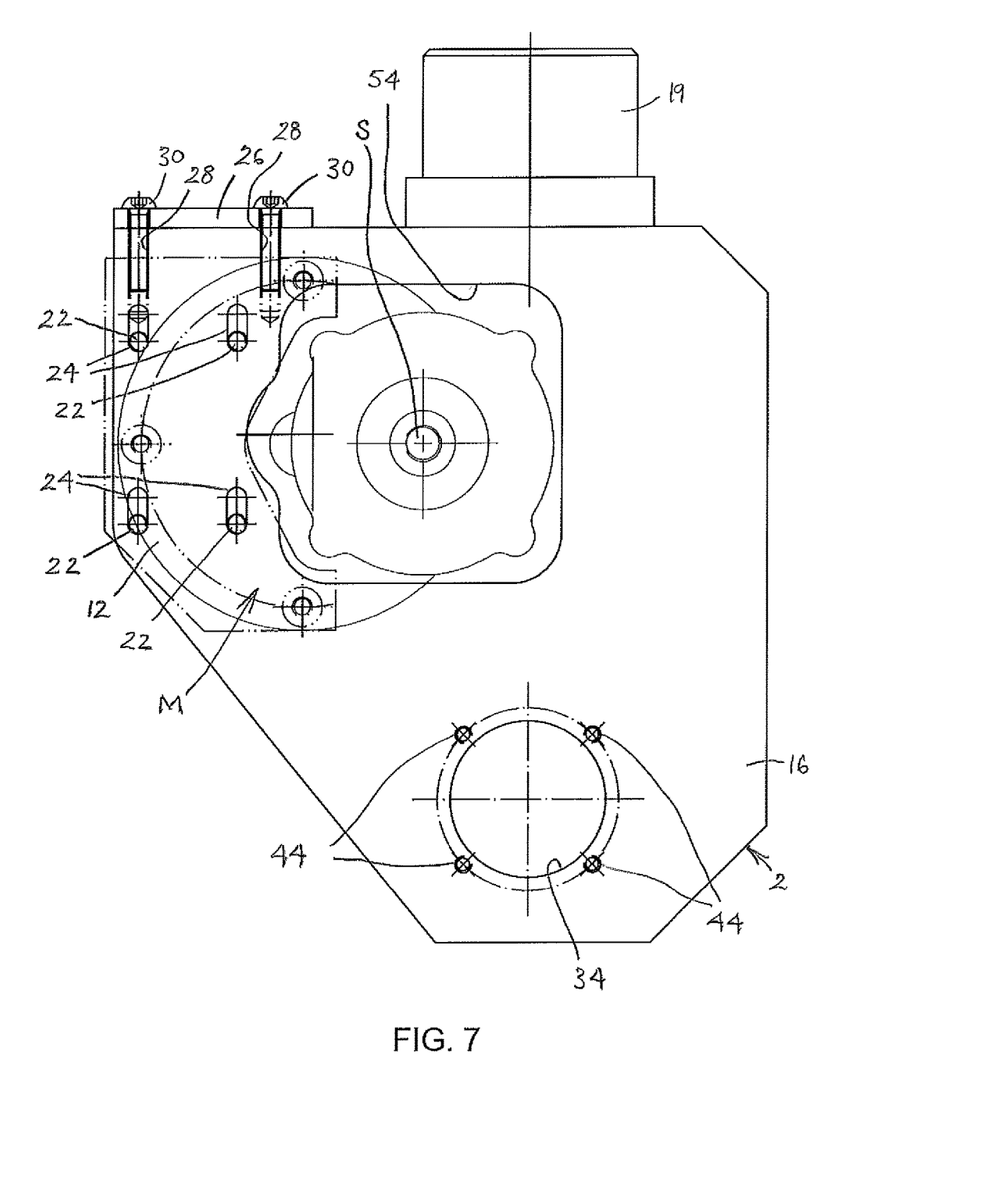
FIG. 7 is a right side plan view showing the drive motor mounting plate and drive motor in a lower most adjusted position relative to the drive pedestal of the vehicle drive system shown in FIG. 1.
Figure 8:
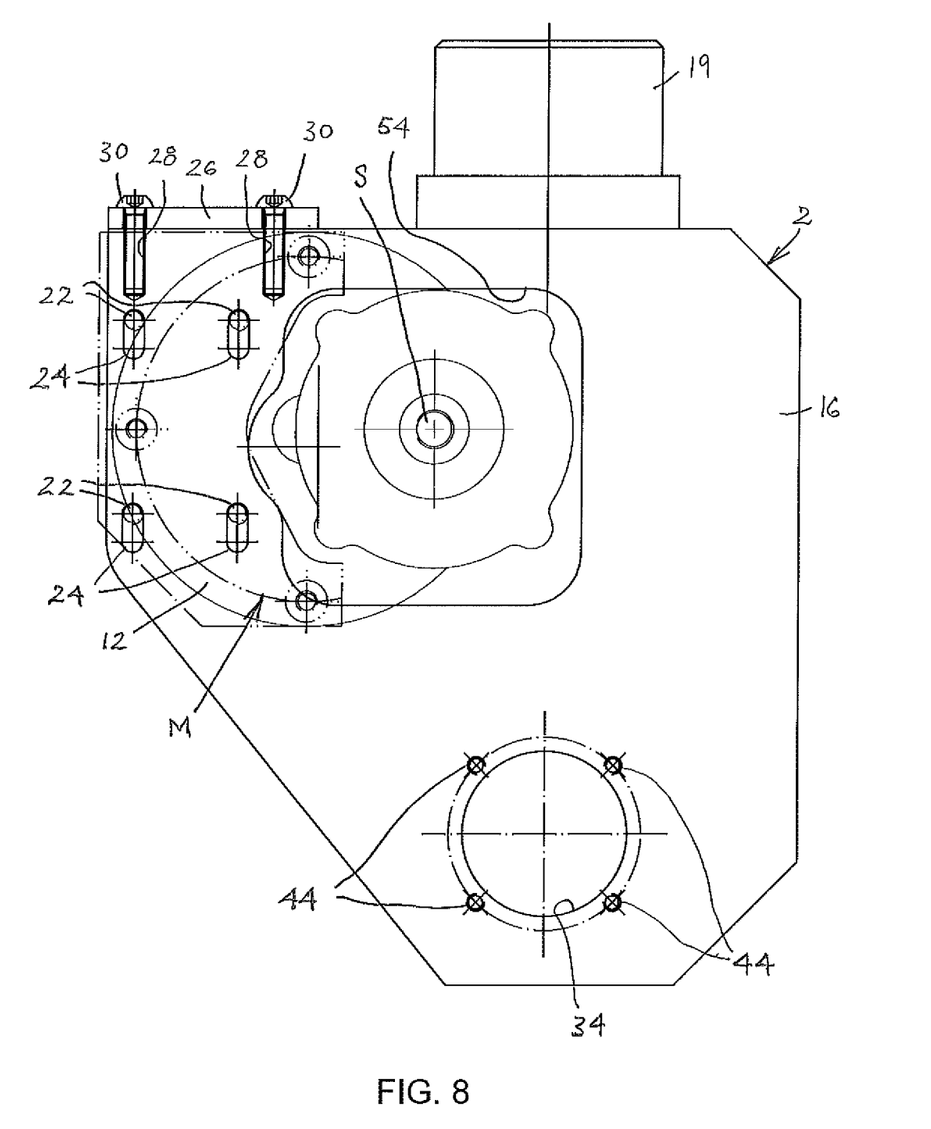
FIG. 8 is a right side plan view showing the drive motor mounting plate and drive motor in an upper most adjusted position relative to the drive pedestal of the vehicle drive system shown in FIG. 1.
Figure 9:
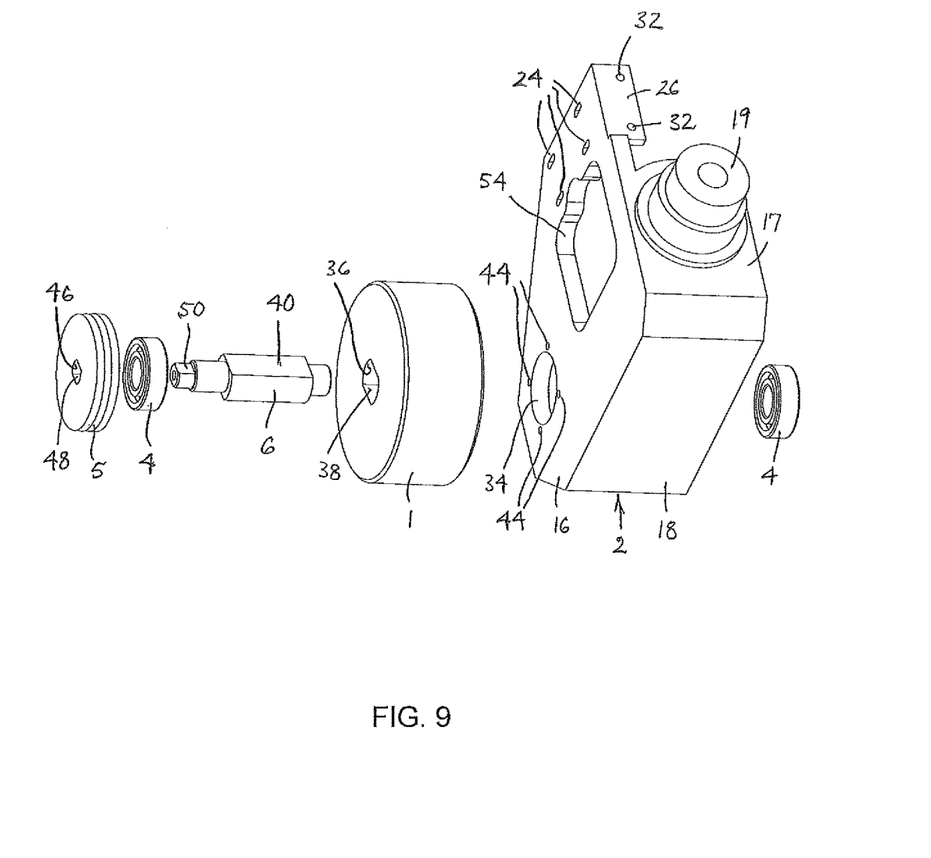
FIG. 9 is a right front perspective partial exploded view of the drive pedestal, drive wheel, axle shaft, bearings and a gear chain wheel of the vehicle drive system shown in FIG. 1.

The drive pedestal 2 includes two vertically extending and substantially parallel side walls 15, 16, connected to a top wall 17 and a front wall 18, as best seen in FIGS. 1, 3 and 9. A mounting hub 19 extends upward from the top wall 17 for rotatable connection to the frame of a vehicle (not shown). The drive motor mounting plate 9 is adjustably connected to the drive pedestal 2. In this example, the drive motor mounting plate 9 includes threaded mounting apertures 20, which receive threaded mounting screws 22 that extend through slots 24 in the upper portion of the side wall 16 and connect the drive motor mounting plate 9 to the drive pedestal 2. A short flange 26 extends from the upper end of the side wall 16, parallel to the top wall 17 and toward the opposite side wall 15. The drive motor mounting plate 9 includes threaded apertures 28 in a top edge. Threaded adjustment screws 30 extend downward through respective apertures 32 in the flange 26 and engage the threaded apertures 28, as best seen in FIGS. 1 and 6, permitting adjustment of the height of the drive motor mounting plate 9 relative to the drive pedestal 2.

As best seen in FIGS. 1, 4, 5 and 9, the vehicle drive system D includes at least two bearings 4 that are connected to the drive pedestal 2 in respective bearing apertures 34 near the bottom of the respective parallel side walls 15, 16. An axle shaft 6 is rotatably connected to the at least two bearings 4. The drive wheel 1 is connected to the axle shaft 6 via a passage 36 through the drive wheel 1, which includes at least one flat surface 38 that corresponds to and engages at least one flat surface 40 on the axle shaft 6. This permits power output to the drive wheel 1 to be efficient and continuous. In this example, fasteners, such as screws 42 engage threaded apertures 44 in the side walls 15, 16 of the drive pedestal 2 and limit axial movement of the at least two bearings 4 and axle shaft 6 relative to the drive pedestal 2, so as to retain the bearings 4 and axle shaft 6.

As best seen in FIGS. 1, 7, 8 and 11, the electric drive motor assembly M includes a low speed drive motor 12 and an output shaft S, with a first gear speed reduction provided therebetween, such as by a gear interface providing a 7.18 to 1 reduction. The chain drive assembly C rotatably connects the electric drive motor assembly M to the drive wheel 1 and provides a second gear speed reduction. The chain drive assembly C further includes a first gear chain wheel 10, a second gear chain wheel 5 and a chain 8 extending between and engaging the first and second gear chain wheels 10, 5, respectively, as best seen in simplified views in FIGS. 1 and 11. The first gear chain wheel 10 is connected to the output shaft S of the electric drive motor assembly M and has a first diameter. The second gear chain wheel 5 is coupled to the drive wheel 1 via the axle shaft 6, as a passage 46 through the second gear chain wheel 5 includes at least one flat surface 48 that corresponds to and engages at least one flat surface 50 on the axle shaft 6. The second gear chain wheel 5 has a second diameter that is larger than the first diameter of the first gear chain wheel 10, resulting in the second gear speed reduction between the electric drive motor assembly M and the drive wheel 1, of 2.2 to 1 reduction. It will be appreciated that the respective first and second gear speed reductions may include different gear ratios that would provide different gear speed reductions, which may depend on the motor and vehicle speeds desired.

The electric drive motor assembly M is connected to the drive motor mounting plate 9, such as by screws 52 being received in threaded apertures. This mounting permits a portion of the electric drive motor assembly M to extend through an aperture 54 in the side wall 16 of the drive pedestal 2. As best seen in FIGS. 1, 6-8 and 11, the mounting of the electric drive motor assembly M to the drive motor mounting plate 9, and the further adjustable connection of the drive motor mounting plate 9 to the drive pedestal 2 permits the position of the drive motor mounting plate 9 to be adjusted relative to the drive pedestal 2. In this example, the adjustment screws 30 may be used to move the drive motor mounting plate 9 away from the axle shaft 6 to reduce slack in the chain 8. Thus, the first gear chain wheel 10 effectively may be moved toward or further from the axle shaft 6 and second gear chain wheel 5 to adjust the tension in the chain 8. This will be appreciated when comparing FIGS. 7 and 8, which show the extreme limits of adjustment of the drive motor mounting plate 9 relative to the drive pedestal 2. It will be appreciated that the adjustable connection may be configured in an alternative manner.

To meet the torque requirements and ensure reliability within the vehicle drive system D, while the drawings are simplified for easier viewing, it will be appreciated that the first gear chain wheel 10 includes two parallel sets of teeth 56, the second gear chain wheel 5 includes two parallel sets of teeth 58, and the chain 8 includes links that engage the two parallel sets of teeth 56, 58 on the respective first and second gear chain wheels 10, 5. For each of the respective gear chain wheels 10, 5, the two parallel sets of teeth effectively form dual gear chain wheels that extend from a single hub.

It will be appreciated that with the vehicle drive system D, the chain drive assembly C extends outward from the drive pedestal 2 in a first direction, from side wall 16, and the controller 13 extends outward from the drive pedestal 2 in an opposed second direction, from side wall 15. Accordingly, the chain drive cover 7 is connected to the side wall 16, while the controller cover 14 is connected to the side wall 15, with the covers being connected to the drive pedestal 2 by suitable means of connection, such as by use of fasteners or the like. The controller 13 provides control signals to the electric drive motor assembly M to control the drive motor 12. With this configuration, steering of a vehicle causes the controller 13 and electric drive motor 12 to rotate together about the hub 19, as part of a compact, integrated vehicle drive system assembly D. In contrast to drive systems that use remote mounting of a controller, this integrated vehicle drive system D helps to avoid having cables or wire harnesses that would wear and possibly become loosened during vehicle steering events.

Figure 10:
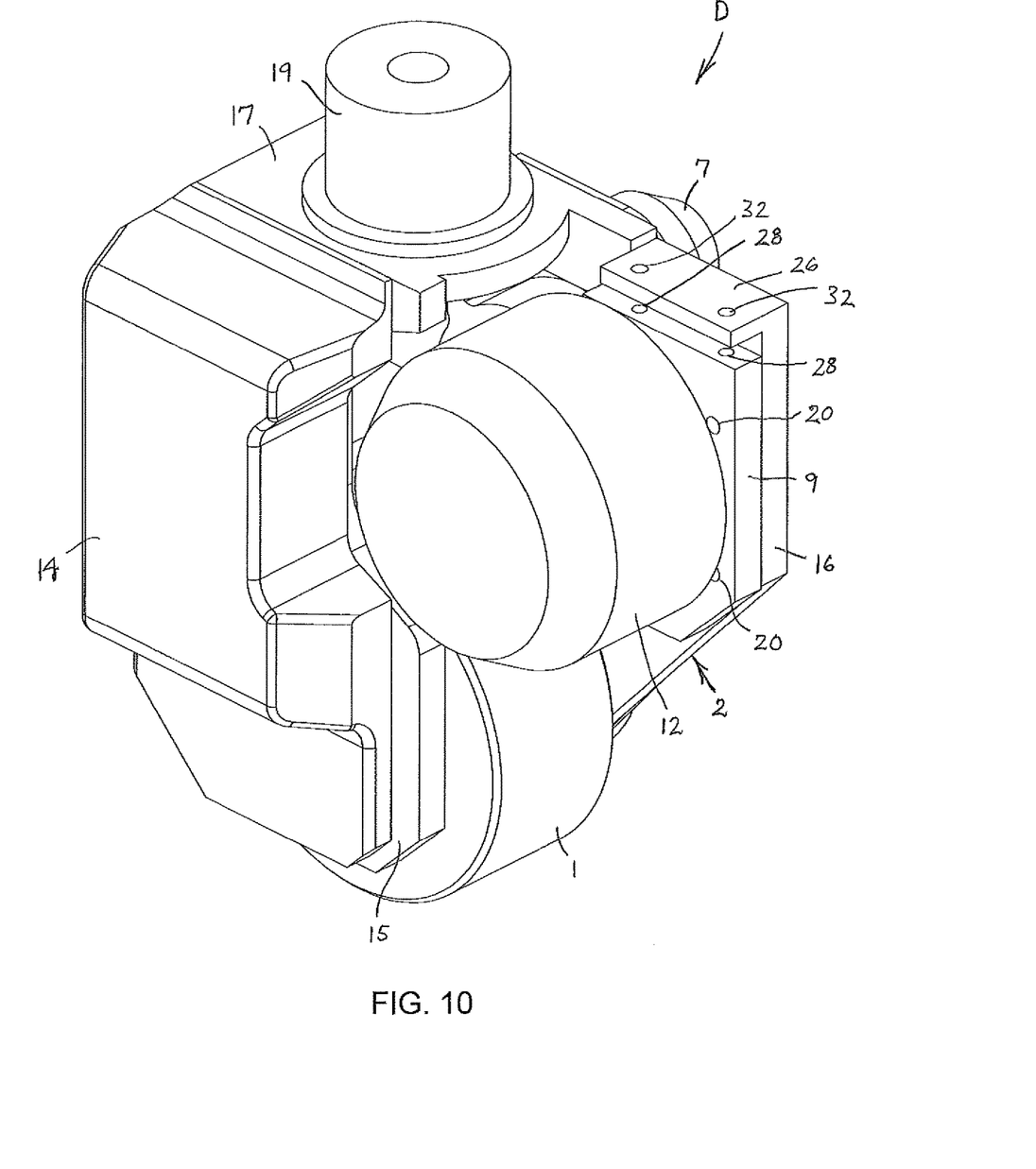
FIG. 10 is a left rear perspective view of the vehicle drive system shown in FIG. 1.

By using the above design, the advantages include that the vehicle drive system D has a first gear speed reduction provided in an electric drive motor assembly M, and a second gear speed reduction provided by a chain drive assembly C. This structure can make the drive system easier to construct and service, provide more accurate speed reduction, and reduce power output losses. The drive controller being installed on the drive pedestal causes it to rotate directionally with the vehicle drive system, which also can help to protect cables from wear and loosening. As best seen in FIGS. 10 and 13, the controller cover 14 and chain drive cover 7 protect against dust, dirt and debris, as well as potential contact with foreign objects.

It will be appreciated that the present disclosure shows and demonstrates a preferred example vehicle drive system, which is discussed in the context of a pallet truck drive system. Indeed, this example is merely illustrative and is not to be considered limiting. It will be apparent to those of ordinary skill in the art that various vehicle drive systems may be constructed and configured for use in material handling vehicles, without departing from the scope or spirit of the present disclosure. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle drive system, comprising:
   a drive pedestal defined by two vertically extending and substantially parallel planar side walls that each are connected to a top wall and a front wall and having a mounting hub extending upward from the top wall,
   a drive motor mounting plate having an adjustable connection to the drive pedestal and being connected to one of the side walls and disposed below a top surface of the pedestal top wall,
   an electric drive motor assembly having an output shaft and being connected to the drive motor mounting plate,
   at least two bearings connected to the drive pedestal,
   an axle shaft rotatably connected to the at least two bearings,
   a drive wheel connected to the axle shaft,
   a chain drive assembly further comprising,
      a first gear chain wheel connected to the output shaft of the electric drive motor assembly and having a first diameter,
      a second gear chain wheel connected to the drive wheel and having a second diameter that is larger than the first diameter of the first gear chain wheel,
      a chain extending between and engaging the first and second gear chain wheels,
   a controller that provides control signals to the electric drive motor assembly and is connected to the drive pedestal.

2. The vehicle drive system of claim 1, wherein the electric drive motor assembly further comprises a first gear speed reduction and the chain drive assembly comprises a second gear speed reduction.

3. The vehicle drive system of claim 1, further comprising a chain drive assembly cover connected to the drive pedestal and covering the chain drive assembly.

4. The vehicle drive system of claim 1, further comprising a controller cover connected to the drive pedestal and covering the controller.

5. The vehicle drive system of claim 3, further comprising a controller cover connected to the drive pedestal and covering the controller.

6. The vehicle drive system of claim 1, wherein the adjustable connection of the drive motor mounting plate to the drive pedestal allows movement of the motor mounting plate toward or away from the axle shaft.

7. The vehicle drive system of claim 1, wherein the adjustable connection of the drive motor mounting plate to the drive pedestal further comprises slots in the drive pedestal.

8. The vehicle drive system of claim 7, wherein the adjustable connection of the drive motor mounting plate to the drive pedestal further comprises screws that pass through the slots in the drive pedestal and are received in threaded apertures in the drive motor mounting plate.

9. The vehicle drive system of claim 1, wherein the adjustable connection of the drive motor mounting plate to the drive pedestal further comprises adjustment screws that engage the drive pedestal and the drive motor mounting plate.

10. The vehicle drive system of claim 9, wherein the adjustment screws move the drive motor mounting plate toward or away from the axle shaft.

11. The vehicle drive system of claim 10, wherein movement of the drive motor mounting plate away from the axle shaft reduces slack in the chain.

12. The vehicle drive system of claim 9, wherein the adjustment screws engage threaded apertures in the drive motor mounting plate.

13. The vehicle drive system of claim 1, wherein a passage through the drive wheel includes at least one flat surface that corresponds to and engages at least one flat surface on the axle shaft.

14. The vehicle drive system of claim 1, further comprising fasteners that engage apertures in the drive pedestal and limit axial movement of the at least two bearings and axle shaft relative to the drive pedestal.

15. The vehicle drive system of claim 1, wherein the first gear chain wheel further comprises two parallel sets of teeth, the second gear chain wheel further comprises two parallel sets of teeth, and the chain further comprises links that engage the two parallel sets of teeth on the first and second gear chain wheels.

16. The vehicle drive system of claim 1, wherein the chain drive assembly extends outward from the drive pedestal in a first direction and the controller extends outward from the drive pedestal in an opposed second direction.

* * * * *